United States Patent
Park et al.

(10) Patent No.: US 11,518,848 B2
(45) Date of Patent: Dec. 6, 2022

(54) POLYESTER RESIN AND PREPARATION METHOD OF THE SAME

(71) Applicant: SK CHEMICALS CO., LTD., Gyeonggi-do (KR)

(72) Inventors: Min A Park, Gyeonggi-do (KR); Ji-Hyun Kim, Gyeonggi-do (KR)

(73) Assignee: SK Chemicals Co., Ltd.

(*) Notice: Subject to any disclaimer, the term of this patent is extended or adjusted under 35 U.S.C. 154(b) by 0 days.

(21) Appl. No.: 17/262,048

(22) PCT Filed: Jul. 8, 2019

(86) PCT No.: PCT/KR2019/008372
§ 371 (c)(1),
(2) Date: Jan. 21, 2021

(87) PCT Pub. No.: WO2020/032399
PCT Pub. Date: Feb. 13, 2020

(65) Prior Publication Data
US 2021/0309796 A1    Oct. 7, 2021

(30) Foreign Application Priority Data

Aug. 8, 2018 (KR) ........................ 10-2018-0092512

(51) Int. Cl.
*C08G 63/199* (2006.01)
*C08G 63/183* (2006.01)
*C08G 63/85* (2006.01)

(52) U.S. Cl.
CPC ......... *C08G 63/199* (2013.01); *C08G 63/183* (2013.01); *C08G 63/85* (2013.01)

(58) Field of Classification Search
CPC ..... C08G 63/183; C08G 63/199; C08G 63/85
See application file for complete search history.

(56) References Cited

U.S. PATENT DOCUMENTS

| | | | |
|---|---|---|---|
| 3,391,124 A | 7/1968 | Duynstee et al. | |
| 3,860,564 A | 1/1975 | Habermeier et al. | |
| 4,853,151 A * | 8/1989 | Vogtle | C07C 255/00 560/183 |
| 6,447,859 B2 * | 9/2002 | Oguro | C08G 63/672 528/307 |
| 7,064,169 B2 | 6/2006 | Ikeda et al. | |
| 2003/0195303 A1 * | 10/2003 | Ikeda | C08L 67/025 525/418 |
| 2007/0276065 A1 * | 11/2007 | Barton | C08G 63/85 524/130 |
| 2011/0052920 A1 | 3/2011 | Yokoyama et al. | |
| 2011/0204407 A1 | 8/2011 | Cupta et al. | |
| 2011/0213077 A1 | 9/2011 | Bertucci et al. | |
| 2014/0296471 A1 | 10/2014 | Ito et al. | |
| 2018/0340062 A1 | 11/2018 | El-Hibri et al. | |
| 2021/0309796 A1 * | 10/2021 | Park | C08G 63/85 |

FOREIGN PATENT DOCUMENTS

| | | |
|---|---|---|
| DE | 1645444 | 10/1970 |
| DE | 2008984 | 9/1971 |
| DE | 60203089 | 7/2005 |
| EP | 1321491 | 6/2003 |
| JP | 2008-260965 | 10/2008 |
| JP | 5223243 | 6/2013 |
| KR | 10-2011-0090945 | 8/2011 |
| KR | 10-2014-0052934 | 5/2014 |
| KR | 10-1543043 | 8/2015 |
| KR | 10-2018-0050347 | 5/2018 |

OTHER PUBLICATIONS

Written Opinion of the International Searching Authority for Application PCT/KR2019/008372 English Translation (Year: 2019).*
Krishnan A. Iyer" Chain mobility, secondary relaxation, and oxygen transport in terephthalate copolyesters with rigid and flexible cyclic dials", Polymer 129 (2017) 117-126 (available online Sep. 22, 2017) (Year: 2017).*
Donald R. Kelsey et al." High Impact, Amorphous Terephthalate Copolyesters of Rigid 2,2,4,4-Tetramethyl-1,3-cyclobutanediol with Flexible Diols" Macromolecules 2000, 33, 5810-5818 (Year: 2000).*
S. R. Turner et al. "Amorphous and Crystalline Polyesters based on 1,4-Cyclohexanedimethanol", Chapter 7 of Modern Polyesters: Chemistry and Technology of Polyesters and Copolyesters, 2003 (Year: 2003).*
Burke et al. "Ketene-Based Route to rigid Cyclobutanediol Monomers for the Replacement of BPA in High Performance Polyesters," ACS Macro Letters, 2012, vol. 1, No. 11, pp. 1228-1232.
International Search Report and Written Opinion for International (PCT) Patent Application No. PCT/KR2019/008372, dated Oct. 28, 2019, 7 pages.
English Translation of the International Search Report for International (PCT) Patent Application No. PCT/KR2019/008372, dated Oct. 28, 2019, 2 pages.

* cited by examiner

*Primary Examiner* — Frances Tischler
*Assistant Examiner* — Gennadiy Mesh
(74) *Attorney, Agent, or Firm* — Sheridan Ross P.C.

(57) ABSTRACT

A polyester resin that exhibits heat resistance and transparency by including at least dispiro[5.1.5.1]tetradecane-7,14-diol as a diol component, and a preparation method of this polyester resin are disclosed. The polyester resin is obtained by copolymerization of two or more glycols in addition to dispiro[5.1.5.1]tetradecane-7,14-diol and dicarboxylic acid component, which may include terephthalic acid. The diol component may include 1,4-cyclohexanedimethanol in a range from 30 to 50 mol % based on 100 mol % of the dicarboxylic acid and dispiro[5.1.5.1]tetradecane-7,14-diol in a range from 5 to 60 mol % based on 100 mol % of the dicarboxylic acid moiety and ethylene glycol.

5 Claims, No Drawings

POLYESTER RESIN AND PREPARATION METHOD OF THE SAME

CROSS-REFERENCE TO RELATED APPLICATION

This application is a national stage application under 35 U.S.C. 371 and claims the benefit of PCT Application No. PCT/KR2019/008372 having an international filing date of 8 Jul. 2019, which designated the United States, which PCT application claims the benefit of Korean Patent Application No. 10-2018-0092512 filed on Aug. 8, 2018 with the Korean Intellectual Property Office, the disclosure of which is incorporated herein by reference in its entirety.

BACKGROUND OF THE INVENTION

(a) Field of the Invention

The present disclosure relates to a polyester resin and a preparation method thereof. More specifically, it relates to a polyester resin having excellent transparency and color characteristics while exhibiting excellent physical properties such as high heat resistance and impact resistance, and a preparation method of the same.

(b) Description of the Related Art

A polyester resin has been widely used in fields such as packaging materials, molded products, and films, and is one of eco-friendly plastics which contain no environmental hormones. Recently, in the polycarbonate which has been used as a heat resistant container for food, harmfulness of bisphenol A has been found. So, the demand for an eco-friendly transparent and heat resistant polyester resin is increasing.

A polyester resin obtained by copolymerization of two or more glycol or dicarboxylic acid components has been commercially widely used to improve moldability and to remove crystallinity. In the case of a homopolyester consisting only of terephthalic acid and ethylene glycol, physical properties and heat resistance can be enhanced through stretching-induced crystallization and heat setting. However, there are limitations in application and enhancement of heat resistance. In the case of the polyester obtained by copolymerization of two or more glycol or dicarboxylic acid components, there is a disadvantage in that it is difficult to enhance heat resistance by a stretching or crystallization process.

As another method to enhance heat resistance of the polyester, a method of using isosorbide (1,4:3,6-dianhydroglucitol), an eco-friendly diol compound derived from starch, as one of monomers is known. Although the polyester resin into which isosorbide is introduced exhibits improved heat resistance and a decreased crystallization rate, there may be a problem of degradation in physical properties such as yellowing during molding. Accordingly, it is required to develop a polyester resin having excellent transparency and color characteristics with excellent heat resistance so as to be suitable for the existing heat resistant polyester resin field.

SUMMARY OF THE INVENTION

Technical Problem

In the present disclosure, there are provided a polyester resin having high transparency and excellent color characteristics with excellent heat resistance, and a preparation method of the same.

Technical Solution

In the present disclosure, there is provided a polyester resin including a dicarboxylic acid moiety derived from a dicarboxylic acid and a diol moiety derived from a diol component obtained by copolymerization of a dicarboxylic acid component and a diol component, wherein the dicarboxylic acid component includes terephthalic acid, the diol component includes dispiro[5.1.5.1]tetradecane-7,14-diol, and the diol moiety derived from dispiro[5.1.5.1]tetradecane-7,14-diol is included in 5 to 60 mol % based on 100 mol % of the dicarboxylic acid moiety.

In one embodiment, the diol component may further include at least one diol compound selected from the group consisting of a C8 to C40 aromatic diol and a C2 to C20 aliphatic diol in addition to dispiro[5.1.5.1]tetradecane-7,14-diol. Herein, the diol moiety derived from the diol compound may be included in 40 to 95 mol % based on 100 mol % of the dicarboxylic acid moiety.

In one embodiment, the diol component may further include 1,4-cyclohexanedimethanol in addition to dispiro[5.1.5.1]tetradecane-7,14-diol. Herein, the diol moiety derived from 1,4-cyclohexanedimethanol may be included in 20 to 50 mol % based on 100 mol % of the dicarboxylic acid moiety.

The dicarboxylic acid component may further include at least one acid component selected from the group consisting of a C8 to C20 aromatic dicarboxylic acid component and a C4 to C20 aliphatic dicarboxylic acid component in addition to terephthalic acid.

The polyester resin may have a glass transition temperature (Tg) of 90° C. or more.

There is provided a preparation method of a polyester resin, including the steps of: performing an esterification reaction or a transesterification reaction on a dicarboxylic acid component including terephthalic acid, and a diol component including dispiro[5.1.5.1]tetradecane-7,14-diol at a pressure of 0.2 to 3.0 kg/cd and a temperature of 200 to 300° C.; and performing a polycondensation reaction on the reaction product at a reduced pressure of 0.1 to 400 mmHg and a temperature of 240 to 300° C., wherein a residual ratio of dispiro[5.1.5.1]tetradecane-7,14-diol in the polyester resin is 40% or more.

The polyester resin prepared by the above preparation method may include 5 to 60 mol % of a diol moiety derived from dispiro[5.1.5.1]tetradecane-7,14-diol based on 100 mol % of the total dicarboxylic acid moiety.

In the above preparation method, the diol component may further include at least one diol compound selected from the group consisting of a C8 to C40 aromatic diol and a C2 to C20 aliphatic diol in addition to dispiro[5.1.5.1]tetradecane-7,14-diol. Herein, the polyester resin may include the diol moiety derived from the diol compound in 40 to 95 mol % based on 100 mol % of the total dicarboxylic acid moiety.

The esterification or transesterification reaction and the polycondensation reaction may be performed in the presence of a catalyst containing at least one metal selected from the group consisting of Ti, Al, Sn, Ge, and Sb, and the catalyst may be used in an amount of 10 to 500 ppm with respect to a total weight of the dicarboxylic acid component and the diol component based on a central metal of the catalyst.

Advantageous Effects

The polyester resin of the present disclosure has excellent transparency and color characteristics with excellent heat resistance, and thus can be suitably used in the existing heat resistant polyester resin field.

Further, according to the preparation method of a polyester resin of the present disclosure, the polyester resin can be obtained with high yield and high purity.

DETAILED DESCRIPTION OF THE EMBODIMENTS

Hereinafter, the present invention will be described in detail.

The Polyester Resin

In the present disclosure, there is provided a polyester resin including a dicarboxylic acid moiety derived from a dicarboxylic acid and a diol moiety derived from a diol component obtained by copolymerization of a dicarboxylic acid component and a diol component, wherein the dicarboxylic acid component includes terephthalic acid, the diol component includes dispiro[5.1.5.1]tetradecane-7,14-diol, and the diol moiety derived from dispiro[5.1.5.1]tetradecane-7,14-diol is included in 5 to 60 mol % based on 100 mol % of the dicarboxylic acid moiety.

The dicarboxylic acid component is used to include a dicarboxylic acid such as terephthalic acid, an alkyl ester thereof (C1 to C4 lower alkyl ester such as monomethyl ester, monoethyl ester, dimethyl ester, diethyl ester, dibutyl ester, etc.), and/or an acid anhydride thereof. That is, the term 'terephthalic acid' in the present disclosure includes terephthalic acid and an alkyl ester thereof (e.g., dimethyl terephthalate, etc.) and/or an acid anhydride thereof. The dicarboxylic acid component may react with the diol component to form a dicarboxylic acid moiety such as a terephthaloyl moiety.

As the dicarboxylic acid component used in the synthesis of the polyester includes terephthalic acid, physical properties such as heat resistance, chemical resistance, or weather resistance (e.g., prevention of molecular weight reduction or yellowing phenomenon caused by UV) of the polyester resin to be prepared may be improved.

The dicarboxylic acid component may further include an aromatic dicarboxylic acid component, an aliphatic dicarboxylic acid component, or a mixture thereof as another dicarboxylic acid component. Herein, the 'another dicarboxylic acid component' refers to a component excluding terephthalic acid among the above dicarboxylic acid components.

The aromatic dicarboxylic acid component may be aromatic dicarboxylic acid having 8 to 20 carbon atoms, preferably 8 to 14 carbon atoms, or a mixture thereof. Examples of the aromatic dicarboxylic acid may include phthalic acid, isophthalic acid, naphthalene dicarboxylic acid such as 2,6-naphthalene dicarboxylic acid, diphenyl dicarboxylic acid, 4,4'-stilbene dicarboxylic acid, 2,5-furan dicarboxylic acid, and 2,5-thiophene dicarboxylic acid, but specific examples thereof are not limited thereto.

The aliphatic dicarboxylic acid component may be an aliphatic dicarboxylic acid having 4 to 20 carbon atoms, preferably 4 to 12 carbon atoms, or a mixture thereof. Examples of the aliphatic dicarboxylic acid may include a cyclohexanedicarboxylic acid such as 1,4-cyclohexanedicarboxylic acid or 1,3-cyclohexanedicarboxylic acid, and a linear, branched, or cyclic aliphatic dicarboxylic acid component such as sebacic acid, succinic acid, isodecyl succinic acid, maleic acid, fumaric acid, adipic acid, glutaric acid, or azelaic acid, but specific examples thereof are not limited thereto.

On the other hand, in the polyester resin of the present disclosure, the dicarboxylic acid moiety may include: 50 to 100 mol %, preferably 70 to 100 mol %, of a moiety derived from terephthalic acid; and 0 to 50 mol %, preferably 0 to 30 mol %, of a moiety derived from at least one dicarboxylic acid selected from the group consisting of aromatic dicarboxylic acids and aliphatic dicarboxylic acids. When too little of the moiety derived from terephthalic acid is included in the dicarboxylic acid moiety, physical properties such as heat resistance, chemical resistance, or weather resistance of the polyester resin may be deteriorated.

The diol component included in the polyester resin of the present disclosure may include dispiro[5.1.5.1]tetradecane-7,14-diol. The dispiro[5.1.5.1]tetradecane-7,14-diol has a solid spiro-ring structure, and is included in the polyester resin to improve heat resistance.

Conventionally, diol compounds such as isosorbide have been used to improve heat resistance of the polyester resin, but the polyesters including isosorbide exhibit yellowing in the molding process and have a high possibility of hydrolysis when exposed to a moisture environment. In the present disclosure, a polyester resin having excellent transparency and color with improved mechanical properties and heat resistance compared to the polyester resin using isosorbide was prepared by using dispiro[5.1.5.1]tetradecane-7,14-diol.

According to one embodiment of the present disclosure, the moiety derived from dispiro[5.1.5.1]tetradecane-7,14-diol may be included in 5 mol % or more, preferably 5 mol % to 60 mol %, more preferably 10 to 50 mol %, based on 100 mol % of the dicarboxylic acid moiety. When the moiety derived from dispiro[5.1.5.1]tetradecane-7,14-diol is included in less than 5 mol % based on 100 mol % of the dicarboxylic acid moiety, heat resistance of the polyester resin cannot be achieved, and when exceeding 60 mol %, the degree of polymerization does not increase during the reaction, so that an effect of increasing Tg may be deteriorated. Therefore, it is preferable to satisfy the above range.

The polyester resin of the present disclosure may further include a diol compound commonly used in the preparation of polyester as the diol component in addition to dispiro[5.1.5.1]tetradecane-7,14-diol. As the diol compound, for example, an aliphatic diol, an aromatic diol, or a mixture thereof may be used.

The aromatic diol may be an aromatic diol compound having 8 to 40 carbon atoms, preferably 8 to 33 carbon atoms. Examples of the aromatic diol may include ethylene oxide and/or propylene oxide-added bisphenol A derivatives such as polyoxyethylene-(2.0)-2,2-bis(4-hydroxyphenyl)propane, polyoxypropylene-(2.0)-2,2-bis(4-hydroxyphenyl)propane, polyoxypropylene-(2.2)-polyoxyethylene-(2.0)-2,2-bis(4-hydroxyphenyl)propane, polyoxyethylene-(2.3)-2,2-bis(4-hydroxyphenyl)propane, polyoxypropylene-(6)-2,2-bis(4-hydroxyphenyl)propane, polyoxypropylene-(2.3)-2,2- bis(4-hydroxyphenyl)propane, polyoxypropylene-(2.4)-2,2-bis(4-hydroxyphenyl)propane, polyoxypropylene-(3.3)-2,2-bis(4-hydroxyphenyl)propane, polyoxyethylene-(3.0)-2,2-bis(4-hydroxyphenyl)propane, or polyoxyethylene-(6)-2,2-bis(4-hydroxyphenyl)propane (polyoxyethylene-(n)-2,2-bis (4-hydroxyphenyl)propane, polyoxypropylene-(n)-2,2-bis (4-hydroxyphenyl)propane, or polyoxypropylene-(n)-polyoxyethylene-(n)-2,2-bis(4-hydroxyphenyl)propane, wherein n is the number of polyoxyethylene or polyoxypropylene units), but the specific examples thereof are not limited thereto.

The aliphatic diol may include an aliphatic diol compound having 2 to 20 carbon atoms, preferably 2 to 12 carbon atoms. Examples of the aliphatic diol may include linear, branched, or cyclic aliphatic diols such as ethylene glycol, diethylene glycol, triethylene glycol, 1,3-propanediol, 1,4-butanediol, 2,3-butanediol, 1,3-butanediol, pentanediol (1,5-pentanediol, etc.), hexanediol (1,6-hexanediol, etc.), neopentyl glycol (2,2-dimethyl-1,3-propanediol), 1,2-cyclohexanediol, 1,4-cyclohexanediol, 1,2-cyclohexanedimethanol, 1,3-cyclohexanedimethanol, 1,4-cyclohexanedimethanol, or tetramethyl cyclobutanediol, but the specific examples thereof are not limited thereto.

The moiety derived from the above-described diol compound may be included in less than 95 mol %, less than 80 mol %, or less than 70 mol % based on 100 mol % of the dicarboxylic acid moiety. The lower limit is not limited, but is specifically 40 mol % or more, 50 mol % or more, or 55 mol % or more. When the moiety derived from the diol compound is included in excess of 95 mol %, the amount of moiety derived from dispiro[5.1.5.1]tetradecane-7,14-diol included is relatively small, so that heat resistance may not be sufficiently improved. In addition, when the moiety derived from the diol compound is included in less than 40 mol %, the degree of polymerization does not increase during the reaction, so that an effect of increasing Tg may be deteriorated. Therefore, it is preferable to satisfy the above range.

For example, an aliphatic diol such as ethylene glycol (EG) and/or 1,4-cyclohexanedimethanol (CHDM) may be further included in addition to dispiro[5.1.5.1]tetradecane-7,14-diol as the diol component. In particular, when 1,4-cyclohexanedimethanol is further included as the diol component, impact strength and heat resistance of the polyester resin may be more improved.

Herein, the moiety derived from 1,4-cyclohexanedimethanol may preferably be included in 20 mol % or more and 50 mol % or less, and more preferably in 25 mol % or more and less than 45 mol % based on 100 mol % of the total dicarboxylic acid moiety. When the moiety derived from 1,4-cyclohexanedimethanol is included in less than 20 mol % based on 100 mol % of the total dicarboxylic acid moiety, an effect of improving heat resistance that can be obtained when 1,4-cyclohexanedimethanol is further included as the diol component cannot be sufficiently achieved. In addition, the impact strength of the polyester resin may be weakened, and thus mechanical properties may be deteriorated such that the resin may be easily cracked. When it is included in 50 mol % or more, the content of dispiro[5.1.5.1]tetradecane-7,14-diol included in the resin decreases, so there is a limitation in improving the heat resistance.

The above-described polyester resin of the present disclosure exhibits excellent heat resistance by including dispiro[5.1.5.1]tetradecane-7,14-diol as the diol component. Specifically, the polyester resin of the present disclosure may have a glass transition temperature (Tg) of 90° C. or more, 95° C. or more, or 100° C. or more. The method of measuring the glass transition temperature may be embodied in examples to be described later.

As described above, the polyester resin of the present disclosure exhibits excellent heat resistance, and thus can be suitably used in fields requiring heat resistance such as food containers and packaging materials, medical packaging and devices, automobile and electronic materials, and construction materials.

The Preparation Method of Polyester Resin

Meanwhile, the present disclosure provides a preparation method of the above-described polyester resin of the present disclosure. Specifically, there is provided a preparation method of a polyester resin, including the steps of: performing an esterification reaction or a transesterification reaction on a dicarboxylic acid component including terephthalic acid, and a diol component including dispiro[5.1.5.1]tetradecane-7,14-diol at a pressure of 0.2 to 3.0 kg/cm$^2$ and a temperature of 200 to 300° C.; and performing a polycondensation reaction on the reaction product at a reduced pressure of 0.1 to 400 mmHg and a temperature of 240 to 300° C., wherein a residual ratio of dispiro[5.1.5.1]tetradecane-7,14-diol in the polyester resin is 40% or more.

According to the preparation method of a polyester resin of the present disclosure, a residual ratio of dispiro[5.1.5.1]tetradecane-7,14-diol is as high as 40% or more, preferably 60% or more, and thus the resin to be prepared may exhibit high transparency and color characteristics with excellent heat resistance.

In the preparation method of a polyester resin of the present disclosure, the dispiro[5.1.5.1]tetradecane-7,14-diol is included such that a diol moiety derived from dispiro [5.1.5.1]tetradecane-7,14-diol is in 5 to 60 mol % based on 100 mol % of the total dicarboxylic acid moiety in the polyester resin to be prepared. Additionally, the above-described diol compound may be further included as the diol component in addition to dispiro[5.1.5.1]tetradecane-7,14-diol. Herein, the diol compound is included such that a diol moiety derived from the above diol compound is in 95 mol % or less, 90 mol % or less, or 85 mol % or less and 30 mol % or more, 35 mol % or more, or 40 mol % or more based on 100 mol % of the total dicarboxylic acid moiety in the polyester resin to be prepared.

In addition, the dicarboxylic acid moiety in the polyester resin to be prepared may include 50 to 100 mol %, preferably 70 to 100 mol % of a moiety derived from terephthalic acid. The moiety derived from at least one dicarboxylic acid selected from the group consisting of aromatic dicarboxylic acids and aliphatic dicarboxylic acids may be included in 0 to 50 mol %, preferably 0 to 30 mol %.

The esterification reaction or the transesterification reaction (hereinafter, referred to as esterification reaction) may be performed in a batch or continuous manner. Each raw material may be separately added to a reactor, but it may be preferable to add the dicarboxylic acid component and the diol component in a mixed slurry form. Herein, water may be additionally added to increase solubility of the diol component which is solid at room temperature, or the slurry may be prepared at 60° C. or higher so that solid components can be melted.

The esterification reaction may be performed at a temperature of 200 to 300° C., preferably 220 to 280° C., more preferably 235 to 265° C. and at a pressure of 0.1 to 3.0 kg/cm$^2$, preferably 0.2 to 3.0 kg/cm$^2$. Herein, it is preferable to increase the progress of reaction by continuously discharging water or alcohol generated as a by-product during the esterification reaction out of the reactor.

The esterification reaction time (average residence time) may usually be 100 minutes to 10 hours, preferably 2 hours to 500 minutes, and may vary depending on the reaction temperature, pressure, and molar ratio of the dicarboxylic acid component and the diol component used.

The esterification reaction may be performed without a catalyst, but may be performed by introducing an appropriate catalyst in order to shorten the reaction time. As the catalyst, titanium (Ti), aluminum (Al), tin (Sn), germanium (Ge), and antimony (Sb)-based catalysts may be used, and these catalysts can also function as a catalyst for the subsequent polycondensation reaction.

Examples of the preferable titanium-based catalyst include tetraethyl titanate, acetyl tripropyl titanate, tetrapropyl titanate, tetrabutyl titanate, polybutyl titanate, 2-ethylhexyl titanate, octylene glycol titanate, lactate titanate, triethanolamine titanate, acetylacetonate titanate, ethyl acetoacetic ester titanate, isostearyl titanate, titanium dioxide, a titanium dioxide/silicon dioxide copolymer, a titanium dioxide/zirconium dioxide copolymer, and the like. In addition, examples of the germanium-based catalyst include germanium dioxide and a copolymer using the same, and examples of the tin-based catalyst include tetrabutyl dibutoxytin oxide, dibutyltin oxide, dibutyltin dilaurate, and the like. These catalysts may be used alone or in combination thereof.

10 to 500 ppm, or 50 to 300 ppm of the catalyst based on a central metal of the catalyst is preferably used with respect to a total weight of raw materials, which are the dicarboxylic acid component and the diol component. When less than 10 ppm of the catalyst is used, the reaction rate may be slow due to insufficient catalyst, and when more than 500 ppm of the catalyst is used, side reactions may occur, or the catalyst may remain in the polyester resin to be prepared, resulting in yellowing. Therefore, it is preferable to satisfy the above range.

In the esterification reaction, a phosphorus-based stabilizer such as phosphoric acid, trimethyl phosphate, and triethyl phosphate may be further added. An added amount of the phosphorus-based stabilizer may be 30 to 500 ppm, or 50 to 300 ppm, with respect to a total weight of raw materials based on a phosphorus element. When the amount of the stabilizer is less than 30 ppm, the polyester resin may not be sufficiently stabilized and a color of the polyester resin may become yellow. When the amount is more than 500 ppm, a polyester resin having a high degree of polymerization may not be obtained.

After completion of the esterification reaction, a polycondensation reaction is performed. The polycondensation reaction is performed at a temperature of 230 to 300° C., preferably 240 to 290° C., more preferably 250 to 280° C. and a reduced pressure of 400 to 0.01 mmHg. The reduced pressure of 400 to 0.01 mmHg is for removing by-products of the polycondensation reaction such as a diol and an oligomer. The polycondensation reaction may be performed for a required time until reaching the desired intrinsic viscosity, for example, for an average residence time of 1 to 10 hours.

When preparing the polyester resin according to the preparation method of the present disclosure, a residual ratio of dispiro[5.1.5.1]tetradecane-7,14-diol is as high as 40% or more, 50% or more, or 60% or more. Therefore, the polyester resin prepared by the above method may exhibit excellent heat resistance and transparency. The residual ratio refers to a content (mol %) of dispiro[5.1.5.1]tetradecane-7,14-diol component (moiety) contained in the polyester resin after the polymerization process relative to the number of moles of dispiro[5.1.5.1]tetradecane-7,14-diol added as a raw material.

Hereinafter, action and effects of the present disclosure are described by specific examples in more detail. Meanwhile, these examples are provided by way of example, and therefore, should not be construed as limiting the scope of the present invention.

The polyester resins of the following examples and comparative examples were evaluated by the following method.

(1) Measurement of Diol Composition in Prepared Polyester Resin

After dissolving the polyester resin in a $CDCl_3$ solvent at a concentration of 3 mg/mL, a moiety derived from dicarboxylic acid and a moiety derived from diol in the prepared polyester resin were quantified by a spectrum confirmed using a 600 MHz nuclear magnetic resonance (NMR) spectrometer.

(2) Intrinsic Viscosity (IV)

After dissolving the polyester resin in 150° C. ortho-chlorophenol at a concentration of 0.12%, the intrinsic viscosity was measured using an Ubbelohde viscometer in a 35° C. thermostat.

(3) Heat Resistance (Tg)

The polyester resin was annealed at 300° C. for 5 minutes, cooled down to room temperature, and then heated again at a rate of 10° C./min to measure Tg at this time (2nd Scan).

(4) Tg Power

Based on a polyethylene terephthalate (PET) resin having a Tg of 80° C., the effect of increasing Tg of each polyester resin of examples and comparative examples was expressed as Tg Power.

Tg Power (° C./mol)=(Tg of A−Tg of B)/mol % of a moiety derived from heat resistant monomer in A A: Each polyester resin of examples and comparative examples B: Polyethylene terephthalate (PET) resin (Tg of 80° C.)

Heat resistant monomer: isosorbide or dispiro[5.1.5.1]tetradecane-7,14-diol (5) Color b It was measured using Colorgard System manufactured by Pacific Scientific.

(6) Haze (%)

After aging a film sample of the copolymerized polyester resin composition for 24 hours in an atmosphere of 23° C. and 65% RH humidity, haze (%) was measured at three different locations of the film sample with a haze meter (NDH2000, manufactured by Nippon Denshoku (Japan)) in accordance with JIS (Japanese Industrial Standards) K7136, and an average value thereof was calculated as a result value.

Examples 1 to 11

Raw materials of dicarboxylic acid (dimethyl terephthalate (DMT)) and diol (dispiro[5.1.5.1]tetradecane-7,14-diol (S6CB), 1,4-cyclodimethanol (CHDM), ethylene glycol (EG)) were added to a 5 L reactor equipped with a stirrer and an outlet condenser in the composition and content of Tables 1 and 2 below. Thereafter, triethyl phosphate (TEP) as a phosphorus-based stabilizer, and dibutyl tin oxide (DBTO) or tetrabutyl titanate (TBT) as a catalyst were added thereto in the content of Tables 1 and 2 with respect to a total weight of raw materials based on the central atom, respectively. After raising the pressure to 2.0 kg/cm' with nitrogen, the reaction was performed while raising the temperature of the reactor to 220 to 250° C.

Methanol generated at this time flowed out of the system to undergo a transesterification reaction. When the generation and outflow of methanol were finished, the reactants were transferred to a polycondensation reactor equipped with a stirrer, a cooling condenser, and a vacuum system, and a polycondensation reaction was performed at a pressure of 1 mmHg or less and a temperature of 250 to 280° C. When an intrinsic viscosity of the reactants reached the maximum, the polymerization was terminated.

Each of the prepared polyester resins was evaluated by the above evaluation method, and the results are shown in Tables 1 and 2 below.

Comparative Examples 1 to 12

The polyester resins were prepared in the same manner as in Examples 1 to 11, except that dispiro[5.1.5.1]tetradecane-7,14-diol (S6CB) or isosorbide (ISB) was used as a diol component, and the raw materials were added according to the composition of Tables 3 to 5 below.

Each of the prepared polyester resins was evaluated by the above evaluation method, and the results are shown in Tables 3 to 5 below.

TABLE 1

| | Components | | Ex. 1 | Ex. 2 | Ex. 3 | Ex. 4 | Ex. 5 | Ex. 6 |
|---|---|---|---|---|---|---|---|---|
| Proportion of input | Diacid | DMT (mol) | 100 | 100 | 100 | 100 | 100 | 100 |
| | Diol | S6CB (mol) | 20 | 30 | 40 | 50 | 60 | 80 |
| | | CHDM (mol) | 45 | 30 | 45 | 45 | 45 | 50 |
| | | EG (mol) | 135 | 140 | 115 | 105 | 95 | 75 |
| | Reaction catalyst | DBTO (ppm) | 300 | 300 | 300 | 250 | 300 | 250 |
| | Stabilizer | TEP (ppm) | 200 | 200 | 200 | 200 | 200 | 200 |
| Results | Diol Composition* | S6CB (mol %) | 13 | 20 | 25 | 29 | 32 | 36 |
| | | CHDM (mol %) | 44 | 30 | 46 | 45 | 46 | 45 |
| | | EG (mol %) | 43 | 32 | 29 | 23 | 22 | 19 |
| | Residual ratio of S6CB (%) | | 65.0 | 66.7 | 62.5 | 58.0 | 53.3 | 45.0 |
| | IV (dl/g) | | 0.62 | 0.60 | 0.60 | 0.56 | 0.55 | 0.57 |
| | Heat resistance, Tg (° C.) | | 94 | 100 | 104 | 111 | 114 | 119 |
| | Tg Power (° C./mol) | | 1.1 | 1.0 | 1.0 | 1.1 | 1.1 | 1.1 |
| | Color b | | 0.3 | 0.5 | 0.7 | 0.8 | 0.7 | 0.8 |
| | Haze (%) | | <1 | <1 | <1 | <1 | <1 | <1 |

*in mol % based on 100 mol % of the dicarboxylic acid component

TABLE 2

| | Components | | Ex. 7 | Ex. 8 | Ex. 9 | Ex. 10 | Ex. 11 |
|---|---|---|---|---|---|---|---|
| Proportion of input | Diacid | DMT (mol) | 100 | 100 | 100 | 100 | 100 |
| | Diol | S6CB (mol) | 20 | 30 | 40 | 50 | 60 |
| | | EG (mol) | 180 | 160 | 140 | 150 | 140 |
| | Reaction catalyst | TBT (ppm) | 250 | 250 | 250 | 250 | 250 |
| | Stabilizer | TEP (ppm) | 100 | 100 | 100 | 100 | 100 |
| Results | Diol Composition* | S6CB (mol %) | 12 | 16 | 24 | 27 | 31 |
| | | EG (mol %) | 88 | 84 | 76 | 73 | 69 |
| | Residual ratio of S6CB (%) | | 60.0 | 53.3 | 60.0 | 54.0 | 51.7 |
| | IV (dl/g) | | 0.55 | 0.56 | 0.58 | 0.56 | 0.58 |
| | Heat resistance (° C.) | | 92 | 96 | 101 | 107 | 112 |
| | Tg Power (° C./mol) | | 1.0 | 1.0 | 0.9 | 1.0 | 1.0 |
| | Color b | | 1.5 | 2.1 | 2.4 | 2.7 | 2.8 |
| | Haze (%) | | <2 | <2 | <2 | <2 | <2 |

*in mol % based on 100 mol % of the dicarboxylic acid component

TABLE 3

|  | Components |  | Comp. Ex. 1 | Comp. Ex. 2 | Comp. Ex. 3 | Comp. Ex. 4 | Comp. Ex. 5 |
|---|---|---|---|---|---|---|---|
| Proportion of input | Diacid | DMT (mol) | 100 | 100 | 100 | 100 | 100 |
|  | Diol | ISB (mol) | 20 | 30 | 40 | 60 | 80 |
|  |  | CHDM (mol) | 45 | 30 | 45 | 45 | 45 |
|  |  | EG (mol) | 135 | 140 | 115 | 95 | 75 |
|  | Reaction catalyst | DBTO (ppm) | 300 | 300 | 300 | 300 | 300 |
|  | Stabilizer | TEP (ppm) | 200 | 200 | 200 | 200 | 200 |
| Results | Diol Composition* | ISB (mol %) | 7 | 10 | 13 | 21 | 29 |
|  |  | CHDM (mol %) | 45 | 30 | 45 | 45 | 45 |
|  |  | EG (mol %) | 48 | 44 | 42 | 34 | 26 |
|  | Residual ratio of ISB (%) |  | 35.0 | 33.3 | 32.5 | 35.0 | 36.3 |
|  | IV (dl/g) |  | 0.66 | 0.62 | 0.64 | 0.60 | 0.58 |
|  | Heat resistance (° C.) |  | 88 | 91 | 96 | 104 | 110 |
|  | Tg Power (° C./mol) |  | 1.1 | 1.1 | 1.2 | 1.1 | 1.0 |
|  | color b |  | 1.4 | 1.2 | 1.7 | 2.1 | 2.3 |
|  | Haze (%) |  | <1 | <1 | <1 | <1 | <1 |

*in mol % based on 100 mol % of the dicarboxylic acid component

TABLE 4

|  | Components |  | Comp. Ex. 6 | Comp. Ex. 7 |
|---|---|---|---|---|
| Proportion of input | Diacid | DMT (mol) | 100 | 100 |
|  | Diol | S6CB (mol) | 5 | 100 |
|  |  | CHDM (mol) | 45 | — |
|  |  | EG (mol) | 150 | 100 |
|  | Reaction catalyst | DBTO (ppm) | 300 | 300 |
|  | Stabilizer | TEP (ppm) | 200 | 200 |
| Results | Diol Composition* | S6CB (mol %) | 3 | 61 |
|  |  | CHDM (mol %) | 45 | — |
|  |  | EG (mol %) | 52 | 38 |
|  | Residual ratio of S6CB (%) |  | 60 | 61 |
|  | IV (dl/g) |  | 0.64 | 0.45 |
|  | Heat resistance (° C.) |  | 82 | 105 |
|  | Tg Power (° C./mol) |  | 0.66 | 0.57 |
|  | color b |  | 0.3 | 0.5 |
|  | Haze (%) |  | <1 | <1 |

*in mol % based on 100 mol % of the dicarboxylic acid component

TABLE 5

|  | Components |  | Comp. Ex. 8 | Comp. Ex. 9 | Comp. Ex. 10 | Comp. Ex. 11 | Comp. Ex. 12 |
|---|---|---|---|---|---|---|---|
| Proportion of input | Diacid | DMT (mol) | 100 | 100 | 100 | 100 | 100 |
|  | Diol | ISB (mol) | 20 | 40 | 60 | 80 | 100 |
|  |  | EG (mol) | 180 | 160 | 140 | 120 | 100 |
|  | Reaction catalyst | TBT (ppm) | 250 | 250 | 250 | 200 | 250 |
|  | Stabilizer | TEP (ppm) | 100 | 100 | 100 | 100 | 100 |
| Results | Diol Composition* | ISB (mol %) | 7 | 16 | 25 | 34 | 42 |
|  |  | EG (mol %) | 93 | 84 | 75 | 66 | 58 |
|  | Residual ratio of ISB (%) |  | 35.0 | 40.0 | 41.7 | 42.5 | 42.0 |
|  | IV (dl/g) |  | 0.57 | 0.60 | 0.58 | 0.54 | 0.54 |
|  | Heat resistance (° C.) |  | 86 | 93 | 101 | 112 | 121 |
|  | Tg Power (° C./mol) |  | 0.9 | 0.8 | 0.8 | 0.9 | 1.0 |
|  | color b |  | 4.3 | 5.1 | 4.5 | 4.6 | 5.1 |
|  | Haze (%) |  | <2 | <2 | <2 | <2 | <2 |

*in mol % based on 100 mol % of the dicarboxylic acid component

Referring to Tables 1 to 5, Examples 1 to 11 containing dispiro[5.1.5.1]tetradecane-7,14-diol as a diol component exhibited higher heat resistance, a lower color b value, and low haze compared to Comparative Examples 1 to 5 and 8 to 12 containing isosorbide with a similar composition, indicating high transparency. Additionally, in Examples 1 to 11, the residual ratio of dispiro[5.1.5.1]tetradecane-7,14-diol was as high as 45% or more.

On the other hand, it could be confirmed from the results of Comparative Examples 6 and 7 that the effect of increasing Tg was deteriorated when the content of the moiety derived from dispiro[5.1.5.1]tetradecane-7,14-diol in the polyester resin is too small or too large. Specifically, as in Comparative Example 6, when the moiety derived from dispiro[5.1.5.1]tetradecane-7,14-diol is less than 5 mol % based on 100 mol % of the dicarboxylic acid component, the effect of increasing Tg was insignificant. When exceeding 60 mol %, as in Comparative Example 7, the degree of polymerization did not increase during the reaction, so that the effect of increasing Tg was decreased.

What is claimed is:

1. A polyester resin obtained by copolymerization of a dicarboxylic acid component and a diol component, comprising a dicarboxylic acid moiety derived from the dicarboxylic acid component and a diol moiety derived from the diol component,
    wherein the dicarboxylic acid component comprises terephthalic acid,
    the diol component comprises dispiro[5.1.5.1]tetradecane-7,14-diol and 1,4-cyclohexanedimethanol,
    the diol moiety derived from dispiro[5.1.5.1]tetradecane-7,14-diol is included in 5 to 60 mol % based on 100 mol % of the dicarboxylic acid moiety, and
    the diol moiety derived from 1,4-cyclohexanedimethanol is included in 30 to 50 mol % based on 100 mol % of the dicarboxylic acid moiety.

2. The polyester resin of claim 1,
    wherein the diol component further comprises at least one selected from the group consisting of a C8 to C40 aromatic diol and a C2 to C20 aliphatic diol in addition to dispiro[5.1.5.1]tetradecane-7,14-diol and 1,4-cyclohexanedimethanol.

3. The polyester resin of claim 1,
    wherein the dicarboxylic acid component further comprises at least one acid component selected from the group consisting of a C8 to C20 aromatic dicarboxylic acid component and a C4 to C20 aliphatic dicarboxylic acid component in addition to terephthalic acid.

4. The polyester resin of claim 1,
    wherein the polyester resin has a glass transition temperature (Tg) of 90° C. or more.

5. The polyester resin of claim 1,
    wherein the diol component further comprises ethylene glycol in addition to dispiro[5.1.5.1]tetradecane-7,14-diol and 1,4-cyclohexanedimethanol.

* * * * *